A. COCHRAN.
SIPHON WATER CLOSET.
APPLICATION FILED NOV. 28, 1913.

1,177,384.

Patented Mar. 28, 1916.
3 SHEETS—SHEET 1.

Witnesses—

Inventor—
Andrew Cochran.
by his Attorneys—
Howson & Howson

A. COCHRAN.
SIPHON WATER CLOSET.
APPLICATION FILED NOV. 28, 1913.
1,177,384.
Patented Mar. 28, 1916.
3 SHEETS—SHEET 2.
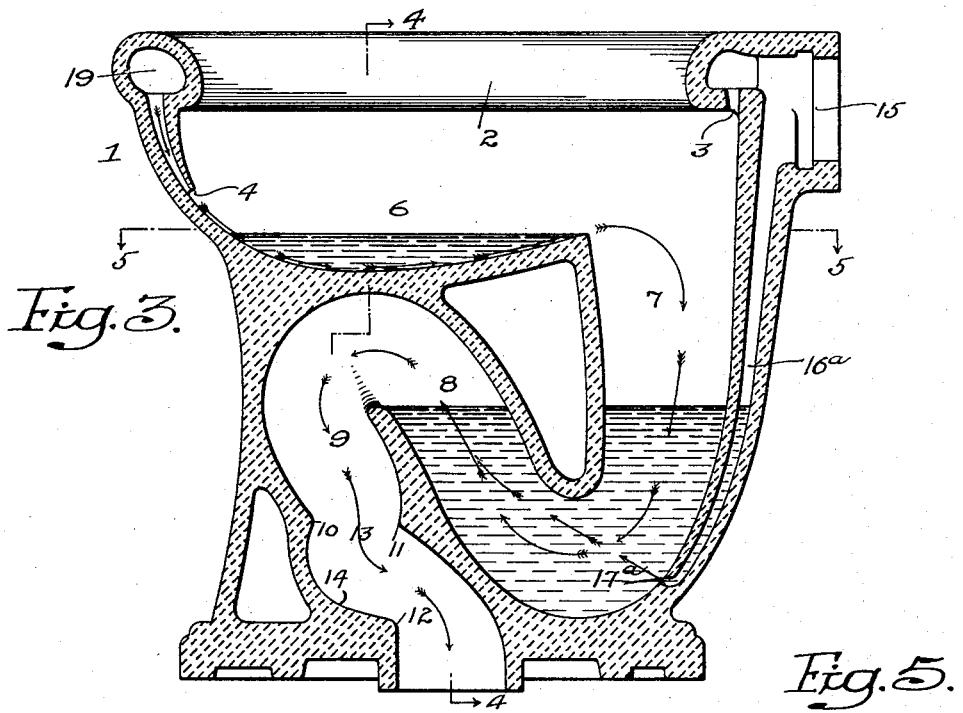
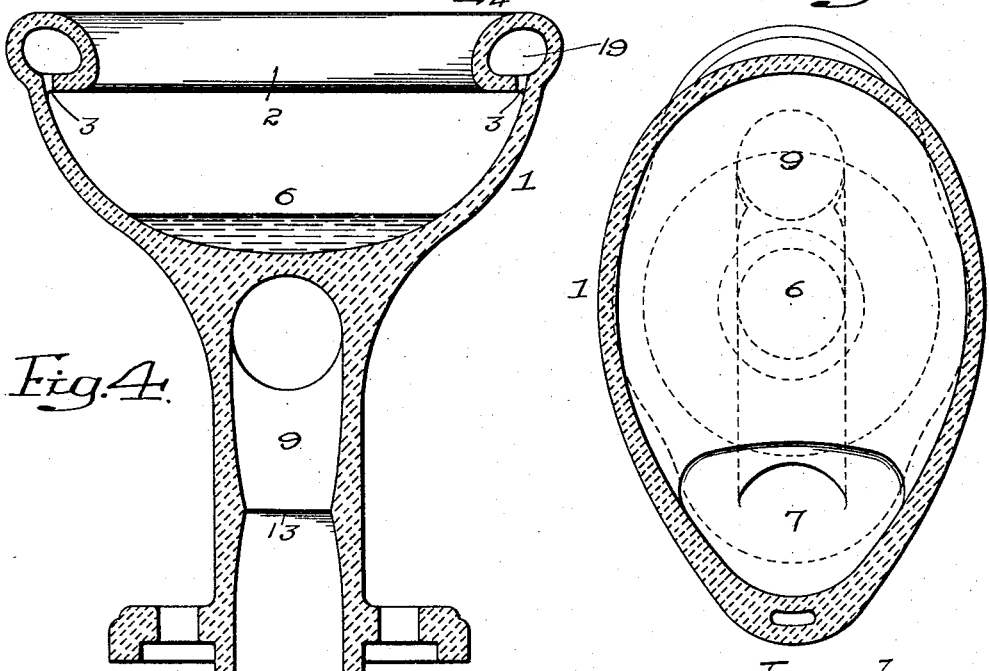
Inventor:—
Andrew Cochran.
by his Attorneys,—
Howson & Howson

A. COCHRAN.
SIPHON WATER CLOSET.
APPLICATION FILED NOV. 28, 1913.

1,177,384.

Patented Mar. 28, 1916.
3 SHEETS—SHEET 3.

Witnesses—

Inventor—
Andrew Cochran,
by his Attorneys—
Howson & Howson

UNITED STATES PATENT OFFICE.

ANDREW COCHRAN, OF TRENTON, NEW JERSEY.

SIPHON WATER-CLOSET.

1,177,384.  Specification of Letters Patent.  Patented Mar. 28, 1916.

Application filed November 28, 1913. Serial No. 803,568.

*To all whom it may concern:*

Be it known that I, ANDREW COCHRAN, a citizen of the United States, and a resident of Trenton, Mercer county, New Jersey, have invented certain Improvements in Siphon Water-Closets, of which the following is a specification.

My invention relates to water closet bowls, and the object of my invention is to provide a bowl of the wash-out type with means for effecting removal of its contents after use by siphonic action. In the present instance such bowl provides for the separate reception of solid and liquid excrement, which renders it of particular value when it is desired to make an examination thereof, as in cases of use by the sick.

My improved bowl is particularly available for hospital use, although it is adapted for general use as well, and when employed for ordinary house use its construction, which makes it peculiarly desirable for hospital use, is of very great value.

Figure 1:
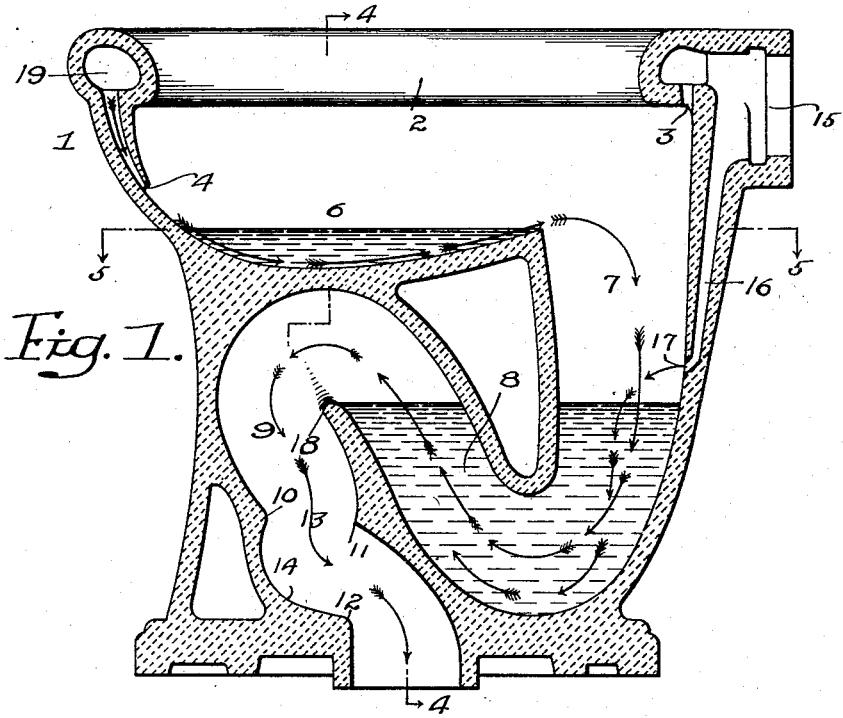
Figure 2:
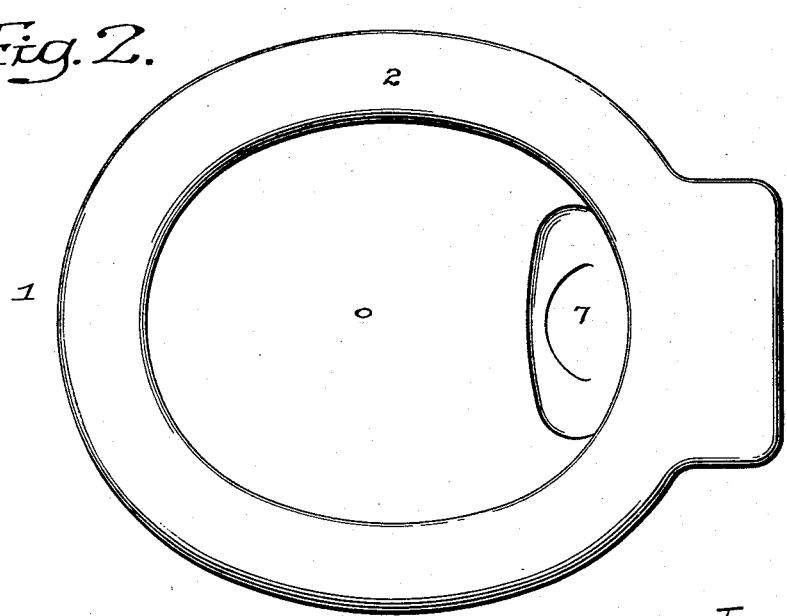
Figure 6:
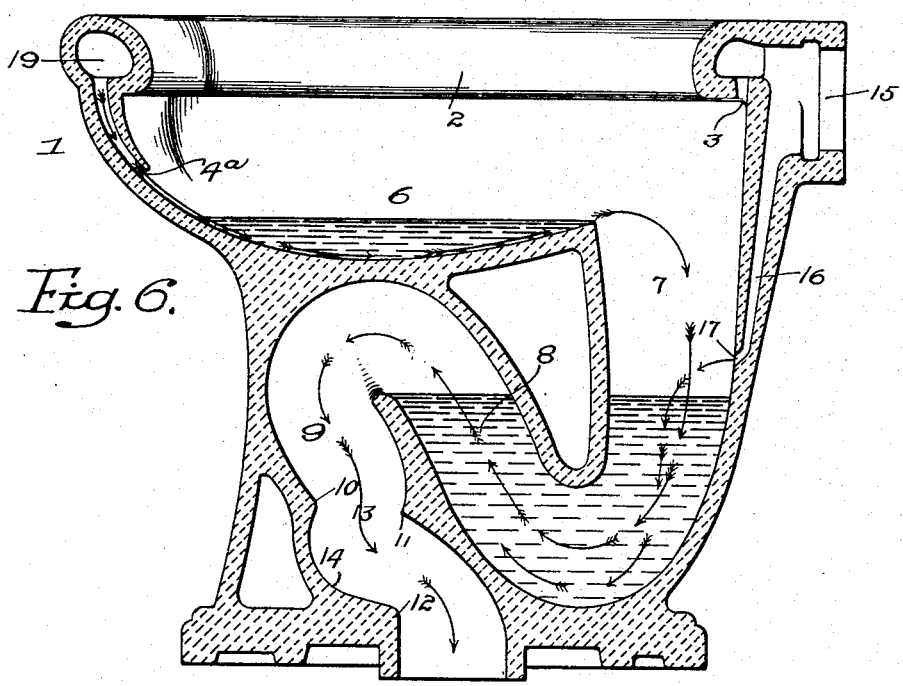
Figure 7:
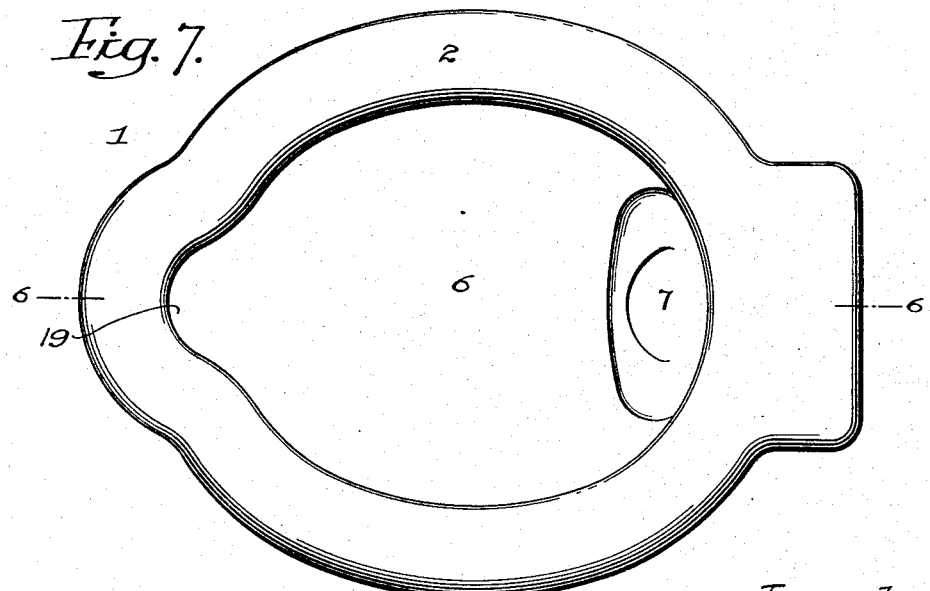

These and other features of my invention are more particularly described hereinafter, reference being had to the accompanying drawings, in which:

Figure 1, is a longitudinal sectional elevation of a closet made in accordance with my invention, taken on the line 1—1, Fig. 2; Fig. 2, is a plan view of same; Fig. 3, is a view similar to Fig. 1, showing a modification within the scope of my invention; Fig. 4, is a vertical sectional view, taken on the line 4—4, Figs. 1 and 3; Fig. 5, is a sectional plan view, taken on the line 5—5, Figs. 1 and 3; Fig. 6, is sectional elevation similar to Figs. 1 and 3, showing a further modification within the scope of my invention, taken on the line 6—6, Fig. 7, and Fig. 7, is a plan view of the structure shown in Fig. 6.

In the drawings, 1 represents the bowl of my improved structure, having the usual flushing rim 2, provided with outlets 3, and with a special enlarged and elongated jet outlet 4, at the front of the bowl. The bowl is provided with a pan or receptacle 6, of the type common to wash-out water closet bowls, and the opening or outlet 4 at the front of the bowl is arranged to discharge a jet of water in a curved path; following the surface of the front of the bowl and said pan or receptacle 6. The contents of the pan or receptacle 6 overflow into a well or outlet passage 7, which communicates directly with the ascending leg 8 of a siphon conduit; the descending leg of which siphon conduit is shown at 9. The construction of this siphon conduit is such that a deep seal is provided, and the bowl provides separate receptacles for the solid and liquid material deposited therein. The descending leg or passage 9 of the siphon conduit is provided with projections 10, 11 and 12, and with a contracted portion 13 between the projections 10 and 11, in accordance with the common practice of constructing closets of this character for the purpose of inducing siphonic action. Between the projections 10 and 12, a deflecting surface 14 is provided to aid siphonic action.

The flushing water is introduced into the bowl through a spud 15 at the rear of the bowl; a portion passing to the flushing rim 2, while another portion is delivered to a jet passage 16, which may discharge at 17 into the well or outlet passage 7 leading from the bowl to the up-leg of the siphon conduit; the purpose or function of which jet passage is to provide a stream of water of driving value to move the body of water in the seal in advance of the motion that would be imparted thereto due to the mass of water passing from the flushing rim and discharging into the pan or receptacle 6 in the upper portion of the same, and overflowing from the latter to the outlet passage 7. At the same time, the pan 6 is scoured clean by the stream of water emerging from openings 3 and the jet opening 4 at the front of the bowl; the latter having greater force.

As constructed, the pan 6 will receive the liquid portion, while the well 7 will receive the solid portion of excrement deposited in the bowl. The rear jet passage 16 may receive approximately one-half of the flushing water, so that a considerable amount of force will be imparted to the jet of water issuing from the outlet 17 thereof, and this jet engaging the water in the seal, will move the latter quickly, overflowing the dam 18 and insuring prompt siphonic action.

The dam may be constructed in any suitable manner, but in the drawings, I have shown the same as rounded or concaved.

I do not wish to be limited to the use of a jet discharging from a point above the seal into the water thereof, as shown in Figs. 1 and 6, since I may employ a jet passage 16ᵃ of the character illustrated in Fig. 3, which extends well below the seal and is provided with an outlet 17ª turned or curved so as to discharge toward the dam to effect a pushing action upon the water in front of it; thereby enabling the water behind it to quickly enter the siphon conduit from the outlet passage or well 7.

The form of bowl illustrated in Figs. 6 and 7, is provided with an extension lip 19, and the front jet, illustrated at 4ª in Fig. 6, is formed in the same in a manner like that shown in Figs. 1 and 3.

I claim:

A water closet bowl having a pan at the front of the same with a discharge outlet or passage leading from said pan at the rear of the bowl, the opening to said passage being disposed well within the area of the bowl opening for direct reception of solid matter, said bowl having a siphon conduit formed within its body and disposed below said pan and continuous with the discharge outlet or passage, with a hollow rim, a jet passage discharging into said pan at the front of the bowl from said hollow rim, a jet passage discharging into said outlet passage at the rear of the bowl to assist siphonic action, and a water inlet supplying said hollow rim and the rear jet simultaneously.

In testimony whereof, I have signed my name to this specification, in the presence of two subscribing witnesses.

ANDREW COCHRAN.

Witnesses:
WM. E. SHUPE,
WM. A. BARR.

Copies of this patent may be obtained for five cents each, by addressing the "Commissioner of Patents, Washington, D. C."